United States Patent
Rexach et al.

(10) Patent No.: US 12,018,850 B2
(45) Date of Patent: Jun. 25, 2024

(54) MODULAR SMART BATHROOM FAN

(71) Applicant: Kohler Co., Kohler, WI (US)

(72) Inventors: Rafael Rexach, Sheboygan, WI (US); Peter Denzin, Glenbeulah, WI (US); Jiunntyng Chen, Kohler, WI (US)

(73) Assignee: Kohler Co., Kohler, WI (US)

( * ) Notice: Subject to any disclaimer, the term of this patent is extended or adjusted under 35 U.S.C. 154(b) by 176 days.

(21) Appl. No.: 17/394,840

(22) Filed: Aug. 5, 2021

(65) Prior Publication Data

US 2022/0049867 A1     Feb. 17, 2022

Related U.S. Application Data

(60) Provisional application No. 63/065,159, filed on Aug. 13, 2020.

(51) Int. Cl.
*F24F 11/00*     (2018.01)
*E03D 9/04*      (2006.01)
(Continued)

(52) U.S. Cl.
CPC ............ *F24F 11/0001* (2013.01); *E03D 9/04* (2013.01); *F24F 7/003* (2021.01); *F24F 7/06* (2013.01);
(Continued)

(58) Field of Classification Search
CPC .......... F24F 11/0001; F24F 7/003; F24F 7/06; F24F 11/56; F24F 11/58; F24F 2221/18;
(Continued)

(56) References Cited

U.S. PATENT DOCUMENTS 4,933,995 A * 6/1990 Canon ................. E03D 9/04
                                               4/209 R
6,539,358 B1 † 3/2003 Coon
(Continued)

FOREIGN PATENT DOCUMENTS

CN        2189225 Y      2/1995
CN      201094582 Y      8/2008
(Continued)

OTHER PUBLICATIONS

Chinese Office Action from Chinese Patent Application No. 202110927268.X, dated Jul. 14, 2023, 13 pages. (including English summary).

(Continued)

*Primary Examiner* — Edelmira Bosques
*Assistant Examiner* — Michael James Giordano
(74) *Attorney, Agent, or Firm* — Lempia Summerfield Katz LLC

(57) ABSTRACT

A modular smart bathroom fan includes a base exhaust fan and one or more modules. The base exhaust fan includes one or more ports that are configured to receive one or more modules. The one or more modules includes a communications module that is configured to communicate with the base exhaust fan and other modules of the one or more modules, receive information from an application or the one or more modules and generate an action to be performed by the base exhaust fan and other modules of the one or more modules.

18 Claims, 12 Drawing Sheets

(51) Int. Cl.
  *F24F 7/003* (2021.01)
  *F24F 7/06* (2006.01)
  *F24F 11/56* (2018.01)
  *F24F 11/58* (2018.01)
  *G10L 15/22* (2006.01)

(52) U.S. Cl.
  CPC .............. *F24F 11/56* (2018.01); *F24F 11/58* (2018.01); *G10L 15/22* (2013.01); *G10L 2015/223* (2013.01)

(58) Field of Classification Search
  CPC ................. F24F 2221/36; G10L 15/22; G10L 2015/223; E03D 9/04; H05K 5/0256; H05K 5/0286
  See application file for complete search history.

(56) References Cited

U.S. PATENT DOCUMENTS

| | | | |
|---|---|---|---|
| 6,979,169 | B2 | 12/2005 | Penlesky et al. |
| 7,311,526 | B2 † | 12/2007 | Rohrbach |
| 7,448,224 | B2 | 11/2008 | Wu et al. |
| 7,840,740 | B2 † | 11/2010 | Minoo |
| 8,763,750 | B1 † | 7/2014 | Berkman |
| 8,770,946 | B2 | 7/2014 | Fitton et al. |
| 9,244,492 | B2 † | 1/2016 | Schneider |
| 9,303,859 | B2 | 4/2016 | Horng et al. |
| 9,414,142 | B1 | 8/2016 | Zauhar et al. |
| 9,698,999 | B2 † | 7/2017 | Mutagi |
| 9,711,160 | B2 † | 7/2017 | Krueger |
| 9,797,404 | B2 | 10/2017 | Karst et al. |
| 9,816,699 | B2 | 11/2017 | Jonas et al. |
| 9,933,153 | B2 | 4/2018 | Mitchell |
| 10,001,288 | B1 † | 6/2018 | Yang |
| 10,030,878 | B2 † | 7/2018 | Nemcek |
| 10,054,127 | B2 | 8/2018 | Karst et al. |
| 10,088,853 | B2 † | 10/2018 | Kolavennu |
| 10,170,123 | B2 † | 1/2019 | Orr |
| 10,274,191 | B2 | 4/2019 | Li et al. |
| 10,281,137 | B2 | 5/2019 | Tsai et al. |
| 10,302,321 | B2 | 5/2019 | Sakai et al. |
| 10,378,777 | B2 | 8/2019 | Sinur et al. |
| 10,429,060 | B2 | 10/2019 | Horng et al. |
| 10,573,077 | B2 † | 2/2020 | Wagner |
| 10,760,579 | B2 | 9/2020 | Karst et al. |
| 10,801,743 | B2 | 10/2020 | Zakula et al. |
| 10,808,727 | B2 | 10/2020 | Liu et al. |
| 10,830,465 | B2 | 11/2020 | Singh et al. |
| 10,837,662 | B2 | 11/2020 | Maeda et al. |
| 10,845,085 | B2 | 11/2020 | Zakula et al. |
| 10,845,511 | B2 † | 11/2020 | Cao |
| 10,928,084 | B2 † | 2/2021 | Ajax |
| 11,085,658 | B1 * | 8/2021 | Weems ................. F24F 11/61 |
| 11,109,694 | B2 † | 9/2021 | Shin |
| 11,355,111 | B2 † | 6/2022 | Kolavennu |
| 11,392,238 | B2 † | 7/2022 | Tu |
| 2003/0177012 | A1 † | 9/2003 | Drennan |
| 2014/0283291 | A1 † | 9/2014 | Austin |
| 2015/0050876 | A1 * | 2/2015 | Sakai ..................... F24F 7/007 |
| | | | 454/256 |
| 2015/0110625 | A1 | 4/2015 | De Siqueira Indio Da Costa et al. |
| 2016/0335140 | A1 * | 11/2016 | Liu ..................... H04M 1/0254 |
| 2018/0017273 | A1 * | 1/2018 | Lin ..................... G05B 19/048 |
| 2018/0313558 | A1 | 11/2018 | Byers et al. |
| 2018/0335228 | A1 | 11/2018 | Brown et al. |
| 2019/0029143 | A1 | 1/2019 | Xie |
| 2019/0242599 | A1 | 8/2019 | Sakai et al. |
| 2019/0264702 | A1 | 8/2019 | Huggins et al. |
| 2019/0291647 | A1 † | 9/2019 | Yang |
| 2019/0360649 | A1 | 11/2019 | Puffer et al. |
| 2022/0390132 | A1 * | 12/2022 | Behnke .................. F24F 11/77 |

FOREIGN PATENT DOCUMENTS

| | | | |
|---|---|---|---|
| CN | 202470321 U | | 10/2012 |
| CN | 205065503 U | | 3/2016 |
| CN | 205536353 U | | 8/2016 |
| CN | 106438420 A | | 2/2017 |
| CN | 207093425 U | | 3/2018 |
| CN | 207111491 U | | 3/2018 |
| CN | WO2018045649 A1 † | | 3/2018 |
| CN | 108869354 A | | 11/2018 |
| CN | 109855153 A | | 6/2019 |
| CN | 208936403 U | | 6/2019 |
| CN | 210197597 U | | 3/2020 |
| IN | 201817949 U | | 5/2011 |
| IN | 106917765 A | | 7/2017 |
| KR | 2020120000170 U | | 1/2012 |
| KR | 101779520 B1 | | 9/2017 |
| KR | 1020180060796 A | | 6/2018 |
| TW | 201912946 A | | 4/2019 |
| WO | 2016200047 A1 | | 12/2016 |
| WO | 2019226791 A1 | | 11/2019 |

OTHER PUBLICATIONS

MPR Associates, "Project ZEPHYR Electrical System Update." mpr.com (pp. 1-11).

Homewrks, "Smartvent, Bathroom Ventilation Fan With Alexa Built-In, Led Light, and Bluetooth Speakers." found at https://manuals.plus/wp-content/sideloads/smartvent-bathroom-ventilation-fan-with-alexa-built-in-led-light-bluetooth-speakers-7148-01-ax-manual-optimized.pdf . . . ,30 pages, Aug. 10, 2020.†

Shannon Liao, "Simplehuman made a new mirror that can be both a lamp and Google Home speaker," found at https://www.theverge.com/2019/1/7/18168476/simplehuman-sensor-mirror-hi-fi-assist-lamp-google-home-speaker-price-ces-2019 . . . , 3 pages, Jan. 7, 2019.†

Icon.AI. "Icon.AI Named as CES 2020 Innovation Awards Winner With Its Venus, Smart Makeup Mirror With Alexa Built-in . . . . Changing the Beauty Industry With Artificial Intelligence," found at https://www.businesswire.com/news/home/20200105005028/en/ICON.Al-Named-as-CES-2020-Innovation-Awards-Winner-With-Its-Venus- Smart-Makeup-Mirror-With-Alexa-Built-in . . . ,3pages, Jan. 5.2020.†

Ashlee Clark Thompson, "The HiMirror Mini told me I have dark circles under my eyes," found at https://www.cnet.com/home/smart-home/mirror-uses-internet-amazon-alexa-to-judge-your-skin-ces-2018/ . . . , 2page, Jan. 7, 2018.†

Mikey Campbell, "Apple's 'smart dock' would give Siri a permanent place in the home," found at https://appleinsider.com/articles/13/12/05/apples-smart-dock-would-bring-siri-into-the-home . . . ,4pages, Dec. 5,2013.†

Daniel R Deakin, "CES 2019 | Lenovo's Smart Tab M10 comes with Smart Dock and Amazon Alexa to make your home smarter," found at https://www.notebookcheck.net/Lenovo-s-Smart-Tab-M10-comes-with- Smart-Dock-and-Amazon-Alexa-to-make-your-home smarter.392686.0.html . . . ,2 pages, Jan. 8.2019.†

Megan Wollerton, "Johnson Controls GLAS review: Costly Cortana-powered GLAS thermostat has a striking design, but it's not for everyone, Johnson Controls $319 GLAS Smart Thermostat has a built-in Cortana speaker and a clear OLED display," found at https://www.cnet.com/reviews/johnson-controls-glas-smart-thermostat-review/ . . . , 8 pages, Aug. 24, 2018.†

D.Prabha, M.S. Karthika and P. Manivana, "Cloud Based Health Monitoring and Abnormality Detection using Smart Mirror," found at https://pdfs.semanticscholar.org/1ae7/f930ed5daca4db-b4e32de0c56fecd95d0f37.pdf . . . , 10 pages, Feb. 2019.†

Riccardo Miotto, Matteo Danieletto, Jerome R. Scelza, Brian A. Kidd and Joel T. Dudley, "Reecting health: smart mirrors for personalized medicine," found at https://www.nature.com/articles/s41746-018-0068-7 . . . ,9 pages, Nov. 8, 2018.†

Binah.ai, "Introducing Binah.ai App: Detecting Vital Signs Through Video of a Person's Face," found at https://www.globenewswire.com/news-release/2020/01/06/1966540/0/en/Introducing-Binah-ai-

(56) References Cited

OTHER PUBLICATIONS

App-Detecting-Vital-Signs-Through-Video-of-a-Person-s-Face. html . . . , 3pages, Jan. 6, 2020.†
Julian Schwazer, "Internet of Things, U—Personal Smart Mirror,", found at https://julianschwazer.al/project/u-personal-smart-mirror/ . . . , Summer semester, 2017.†
DECCAN Chronicle,"speaker docks for iPhone," found at https://www.deccanchronicle.com/140712/technology-mobiles-and-tabs/gallery/10-docking-speakers-iphone . . . ,6pages, Jul. 12, 2014.†

\* cited by examiner
† cited by third party

MODULAR SMART BATHROOM FAN

This application claims priority benefit of Provisional Application No. 63/065,159 filed Aug. 13, 2020, which is hereby incorporated by reference in its entirety.

FIELD

This disclosure relates in general to a smart bathroom system.

BACKGROUND

Current bathroom fans are singularly focused on the removal of moisture and odor. An exhaust fan pulls air (and humidity and odor) from a room and vents the air elsewhere. Current multifunctional controls for bathroom fans are limited and do not allow for optimal use. A user operates the exhaust fan by turning on and off a switch. Some fans may include a timer or different settings. However, the use of the fan still requires interaction by the user. Current bathroom fans do not collaborate with other smart bathroom products such as smart toilets, smart mirrors, smart showers, etc. These smart bathroom products also, while potentially programable, may not be accessible or useful in certain situations.

There is therefore a need for a smart fan that is modular and easily configurable. There is also a need for a smart mirror or bathroom accessory that is multifunctional depending on a desired use.

SUMMARY

In one embodiment a modular smart bathroom fan comprises one or more modules and a base exhaust fan. The one or more modules perform operations of the smart bathroom fan. The base exhaust fan comprises one or more ports that are configured to receive the one or more modules. The one or more modules comprise a communications module that is configured to communicate with the base exhaust fan and other modules of the one or more modules, receive information from an application or the one or more modules and generate an action to be performed by the base exhaust fan and other modules of the one or more modules.

In one embodiment, the one or more ports include a mechanical dock configured to secure the one or more modules to the base exhaust fan.

In one embodiment, the one or more ports include an electronic dock configured to provide communications between the one or more modules and the base exhaust fan.

In one embodiment, a controller is configured to activate the one or more modules in response to the one or more modules being received at the one or more ports. In one example, the controller communicates with a server to activate the one or more modules. In one example, the controller receives a user input to activate the one or more modules.

In one example, the controller includes a first program code for controlling the base exhaust fan and a second program code for controlling the base exhaust fan, wherein the controller accesses the second program code in response to the communication module being received at the one or more ports. The program code includes controller includes an interface for a remote control.

In one example, the controller includes a first program code for controlling the base exhaust fan and a second program code for controlling the base exhaust fan, wherein the controller accesses the second program code in response to the one or more modules being received at the one or more ports.

In one example, the controller includes a first program code for controlling one or more modules and a second program code for controlling the one or more modules, wherein the controller accesses the second program code in response to the communication module being received at the one or more ports.

In one example, the second program code includes access to sensor data from an external device. For example, the second program code includes a command initiated by a flush cycle of a toilet.

In one example, the one or more modules further comprise at least one of: a virtual assistant module, a scent module, a humidity module, an air quality module, or an air purification module. The installation of the communication module enable reporting of data from the virtual assistant module, the scent module, the humidity module, the air quality module, or the air purification module to a server.

In another embodiment, a method for installing and operating a modular smart bathroom fan includes installing a base exhaust fan comprises one or more ports that are configured to receive one or more modules, installing a communications module that is configured to communicate with the base exhaust fan and other modules of the one or more modules, installing one or more additional modules, receiving, by the communications module, information from the one or more additional modules, generating, by the communications module, an action to be performed by the one or more additional modules, and performing the action by the one or more additional modules.

In one example, the one or more modules further comprises at least one of: a virtual assistant module, a scent module, a humidity module, an air quality module, or an air purification module.

In one example, the method further comprises accessing a first program code for the base exhaust fan; and accessing a second program code for the base exhaust fan in response to the installation of the communication module.

In one example, the method further comprises receiving a voice commend at a microphone of the virtual assistant module for the action of the one or more modules or from an external device.

In one embodiment, a smart mirror comprises a mirror, a display configured to display information to a user; and a docking mechanism configured to dock with one or more docking accessories, each of which provide one or more additional functions for the smart mirror. The one or more docking accessories may comprise at least one of: a standard dock, a charging dock, a speaker dock, a shower wall mount dock with storage shelf, or an articulated wall mount arm dock.

BRIEF DESCRIPTION OF THE DRAWINGS

Exemplary embodiments are described herein with reference to the following drawings.

DETAILED DESCRIPTION

Embodiments provide a smart bathroom fan that may be configured in multiple different ways to provide different functions and a smart mirror that provides different functionality depending on which docking accessory the smart mirror is docked with. The smart bathroom fan, for example, may be configured with one or more modules that actively monitor bathroom air quality to provide continuous fresh air or scented air, reduce humidity, change lighting, or provide other smart functions. There are several advantages to the smart bathroom fan. The smart bathroom fan provides a retrofittable retail do-it-yourself (DIY) solution. A user may easily install the fan and each of the modules at different times depending on the requirements or desires of the user (e.g., provided to the smart bathroom fan through user inputs). The smart bathroom fan is also a platform for technologies that deliver experiences. By being modular, the smart bathroom fan enables customization and upgradability. Modularity creates an accessible entrance into the category with the ability to expand when needed or desired. The smart modular bathroom fan allows a range of price points and functions stemming from one base product that does not have to be replaced for each upgrade.

The smart bathroom fan supports multifunctional experiences in an innovative clean aesthetic. Similarly, the smart mirror provides multifunction experiences by the user of the different docking accessories in an innovative clean aesthetic.

Figure 1:
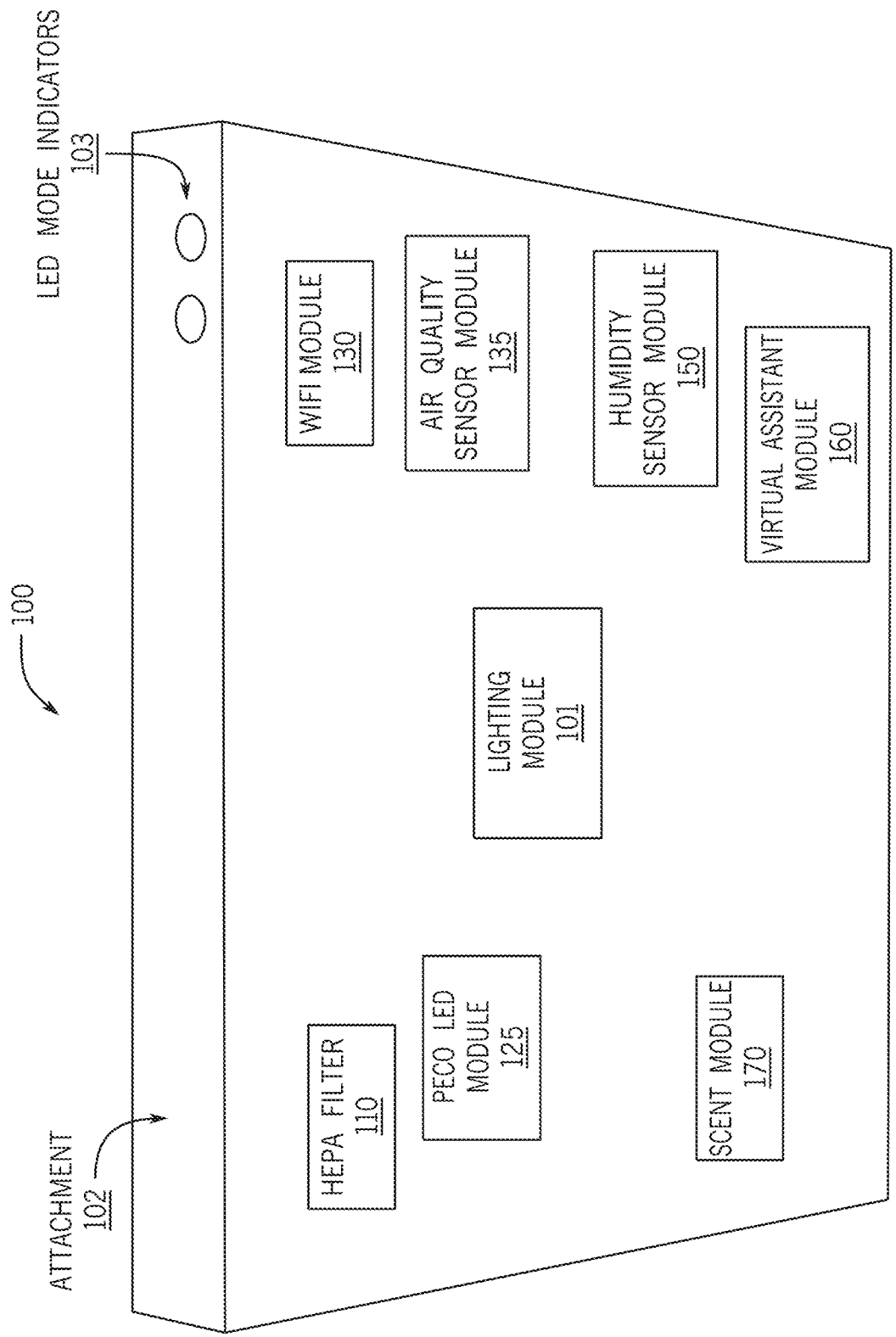
FIG. 1 illustrates an example modular smart bathroom fan.

FIG. 1 depicts an example modular smart bathroom fan 100. The example modular smart bathroom fan 100 includes an attachment device 102, a High Efficiency Particulate Air (HEPA) filter module 110, a light emitting diode (LED) mode indicator 103, a Wi-Fi module 130, an air quality sensor module 135, a humidity sensor module 150, a virtual assistant module 160, a scent module 170, a photoelectrochemical oxidation (PECO) LED module 125, and a lighting module 101. A controller (e.g., controller 400) may be configured to activate the one or more modules in response to the one or more modules being received at the one or more ports. For example, the controller may access a program or code that corresponds to a module that is installed. The program or code may be downloaded from the installed module or otherwise accessed from memory. In some examples, the controller is configured to activate a module in response to the installation of another module. Additional or fewer components may be included.

The attachment device 102 may include a magnetic dock for the bathroom fan 100. An electromagnet or another type of magnet may be including in the housing for the bathroom fan 100. A housing mounting in the ceiling or wall has a corresponding magnet to provide a magnetic force that secures the smart bathroom fan 100. The bathroom fan 100 may be released by turning off the electromagnetic. The presence of the bathroom fan 100 may be detected based on the mating of the two magnets.

The magnet may physically secure the bathroom fan 100 to the ceiling or wall as a mechanical dock. Other types of mechanical docks configured to secure the one or more modules to the base exhaust fan are contemplated. The magnet may also complete an electrical path that indicates the presence of the module. For example, the magnet may be an electronic dock configured to provide communications between the one or more modules and the base exhaust fan.

As depicted, the smart bathroom fan includes the light fixture/lighting module and/or a light shield or cover that covers up each of the modules. The modular smart bathroom fan 100 includes multiple features that are modular (i.e., can be easily removed or added to the device) to allow customers to start with a base device and upgrade to the features they desire. The smart fan may be configured with one or more of a lighting, scent, artificial intelligence (AI) speaker, or presence modules. Other modules may also be provided. In an embodiment, the smart fan 100 includes a carbon monoxide (CO) sensor, humidity sensor, odor sensor, scent dispenser, safety module, and smart speaker which can be removed by a push-push mechanism for swapping consumables, upgrading features or maintenance. The push-push mechanism may be a switch that secures the module to the base by a first push of the module into the base and releases the module from the base by a second push of the module into the base. When configured as such, the smart fan provides predictive scent and fresh air in the bathroom, delivers fresh air in the bathroom with the ability to program scent scenes based on bathroom usage, and may contain odor masking before a user uses the toilet. In addition, the smart fan may include a display that can be configured to display environmental data such as air quality, pollen count etc., themed lighting, or midnight task lighting.

The modular smart bathroom fan 100 may be connected and controlled by an application or app. The modular smart bathroom fan 100 may include essential task lighting or advanced circadian lighting with a wayfinding nightlight. The modular smart bathroom fan 100 may entertain with music, news, weather, and smart home voice controls via an integrated application such as a virtual assistant application. The modular smart bathroom fan 100 may include easy physical controls to access advance features without complex wiring quickly. The modular smart bathroom fan 100 may disinfect bathroom surfaces from harmful bacteria, and viruses with 405 nm LED lighting. The modular smart bathroom fan 100 may reduce airborne pollutants by analyzing the air quality and intelligently purifying via HEPA and PECO technologies. The modular smart bathroom fan 100 may infuse a bathroom with a user's selected scents. The modular smart bathroom fan 100 may protect a user's safety while in the bathroom.

Figure 2:
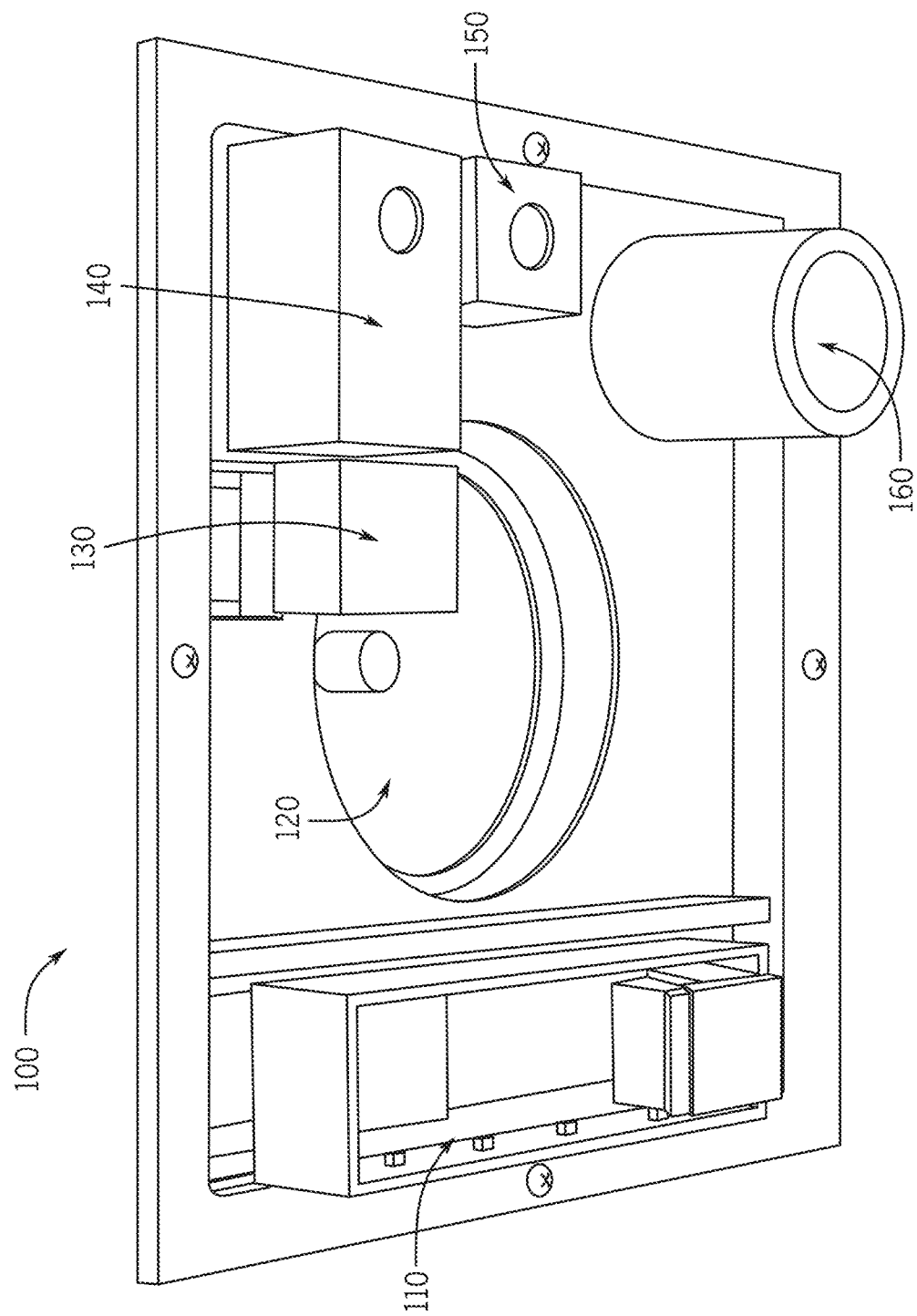
FIG. 2 illustrates the modularity of the modular smart bathroom fan of FIG. 1.

As depicted in FIG. 1, the example modular smart bathroom fan 100 includes a magnetic attachment 102, a HEPA filter module 110, a PECO LED module 125, a scent module 170, a Wi-Fi connection module 130, an air quality sensor module 135, a humidity sensor module 150, and a virtual assistant module 160. FIG. 2 depicts the example modular smart bathroom fan 100 without the cover/lighting module. As depicted, each module of the modular smart bathroom fan 100 has been pulled slightly out of the base of the modular smart bathroom fan 100. Each of these modules is depicted as individual components in FIG. 3. FIG. 2 includes the air purification module 110, the exhaust fan module 120, the Wi-Fi connection module 130, the air quality module 140, the humidity module 150, and the virtual assistant module 160. Additional or fewer components may be included.

Figure 3:
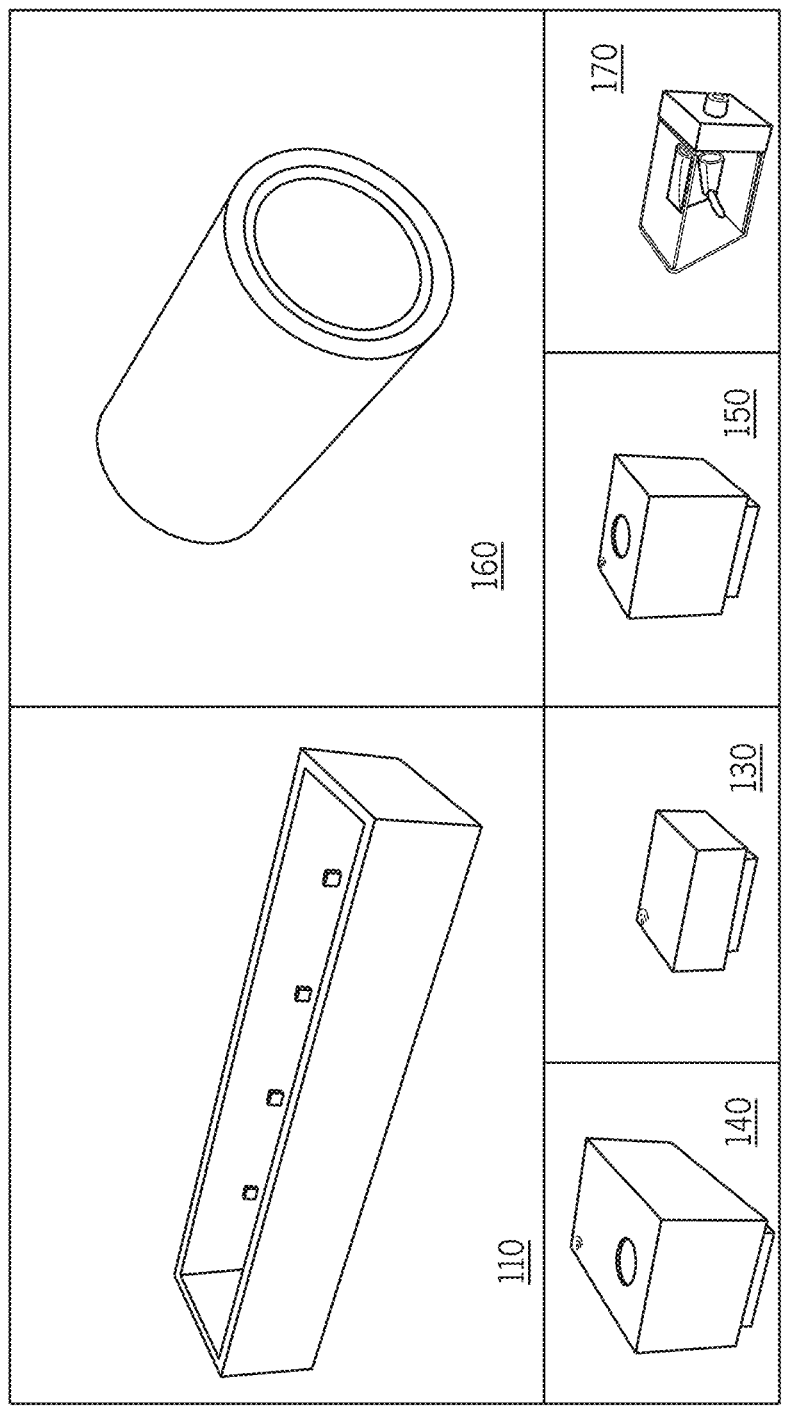
FIG. 3 illustrates example modules for the modular smart bathroom fan.

FIG. 2 and FIG. 3 depict the base of the example modular smart bathroom fan 100. The base includes a base exhaust fan module 120 and the modular base. The base may come in multiple retrofittable sizes, for example, approx. (10.25 inches by 10.25 inches). The base fan/exhaust fan may include a DC motor with two or more speeds, an on or off wall switch (wired or wireless), and a base cover, which may be any color including white. The modular base is configured to accept each of the modules as described below. Each module may provide a different service or function. When the module is inserted or connected to the base station, the service or function may be activated. When the module is not inserted or otherwise inactive, the service or function is not activated. Each of the modules may also provide limited or additional functionality when combined with other modules. For example, the Wi-Fi connection module may provide remote access through the use of an application to control the scent module or fan.

FIG. 3 depicts example modules that may be used with the modular smart bathroom fan 100. FIG. 3 includes the air purification module 110, the virtual assistant module 160, the air quality module 140, the Wi-Fi connection module 130, the humidity module 150, and the scent module 170. Additional, different, or fewer detachable modules may be included.

The Wi-Fi connection module/communication module 130 provides for app control, scheduling and settings for each module and enables smart modules. The Wi-Fi connection module 130 may also provide support for a humidity sensor/app trigger and a motion sensor/app trigger. The Wi-Fi connection module 130 may be configured to interact with a web based or internet-based application and may be in communication with a smart home system or application. The Wi-Fi connection module 130 may be plug and play and may snap or plug into the base of the modular smart bathroom fan 100 and provide immediate functionality. The Wi-Fi connection module 130 may use a quick connect system to access local Wi-Fi or may require additional setup if there are security issues or passkey/password protected systems. The Wi-Fi connection module 130 may provide alternative communication capabilities such as Bluetooth or other wireless communication standards. The Wi-Fi connection module 130 may support Dual-band Wi-Fi and 802.11 a/b/g/n/ac (2.4 and 5 GHz) networks. Alternatively, different modules may be configured to provide the alternative communications. For example, one or more modules may include Bluetooth connectively or other communication capabilities to communicate with other modules or other smart systems in the bathroom or house. Additionally, since the Wi-Fi connection module 130 is a separate component, if technology advances or if there are any issues with the component, it may be replaced without removing the entirety of the base fan.

The Wi-Fi connection module 130 (or communications module) may provide the processing for the modular smart bathroom fan 100. The Wi-Fi connection module 130 may include a processor and memory that are configured to execute and store instructions for operation of the modular smart bathroom fan 100. The processor may be one or more general processors, digital signal processors, application specific integrated circuits, field programmable gate arrays, servers, networks, digital circuits, analog circuits, combinations thereof, or other now known or later developed devices for analyzing and processing data. The memory may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. The Wi-Fi connection module 130 may store and execute instructions for operation of one or more of the modules such as the scent module 170 or the air purification module 110. These settings may be programed prior to inserting the Wi-Fi connection module 130 or may be updated or changed by using an application on a user's smartphone or portable device.

The virtual assistant module 160 uses the connectively of the Wi-Fi connection module 130 to communicate with the internet or other systems to provide additional functionality for the smart modular fan. The virtual assistant module 160 may provide a predetermined sound quality, Wi-Fi multi-room music, smart home control, and/or voice control for the modular smart bathroom fan 100.

The virtual assistant provides information, performs tasks, or provides services to a user. The virtual assistant may be a device or a software agent. The virtual assistant may receive voice commands through natural language processing. The information provided by the virtual assistant may include data that is easily accessed from the internet, including the weather, traffic, music lyrics, or the news.

The virtual assistant module 160 includes a microphone and a speaker. In the default mode, the virtual assistant module 160 continuously listens to all speech, monitoring for a wake word to be spoken. After hearing the wake word, the virtual assistant module 160 listens for any commands. Each module may provide a "skill" that includes one or more commands that the virtual assistant can understand and react to. For example, the scent module 170 may include a skill or command that results in one or more scent cartridges being activated. The virtual assistant module 160 may require and internet connection to provide voice recognition capability. Alternatively, the virtual assistant module 160 may be loaded with a select number of commands or may be programmed though the use of a web-based application from a personal computer or smartphone. Like the other modules, if technology advances or if there are any issues with the module, it may be replaced without removing the entirety of the base fan. The virtual assistant module 160 may also be updated or configured through software updates or patches.

In addition to or alternatively, modules in the modular smart bathroom fan 100 may be controlled using a physical remote. A remote accessory may use a separate module or may be incorporated into the virtual assistant or Wi-Fi connection module 130. The remote accessory module may communicate with a wireless battery powered physical remote. The wireless physical remote may control fan modes, light modes, or other functions of other modules. The wireless physical remote may include one or more buttons or may include a touch screen or microphone that is configured to receive commands from a user.

The scent module 170 may include one or more slots that are configured to accept replaceable scent cartridges. The scent module 170 may be configured to function with the base fan, the Wi-Fi connection module 130, the virtual assistant module 160, or other modules. The scent module 170 may be configured with the ability to program scent scenes based on bathroom usage. In combination with one or more of the air quality modules described below, the scent module 170 may contain odor masking before the user a uses the toilet. The scent module 170 may include aroma therapy scents. The scent module 170 may be part of or a component in the air quality system or may be a separate module.

The air purification/quality system may include one or more components/modules that improve or alter the air quality of the bathroom or room in which the modular smart bathroom fan 100 is installed. The air quality system may include one or more sensors. For example, the air quality module may include air quality sensors such as temperature, humidity, volatile organic compounds (VOCs), CO2, and particulate matter. The air quality system may include components that purify or alter the air, for example, the scent module 170 described above, a HEPA Filter (indoor air circulation), and/or a UV/PECO Disinfecting filter (indoor air circulation).

Figure 4:
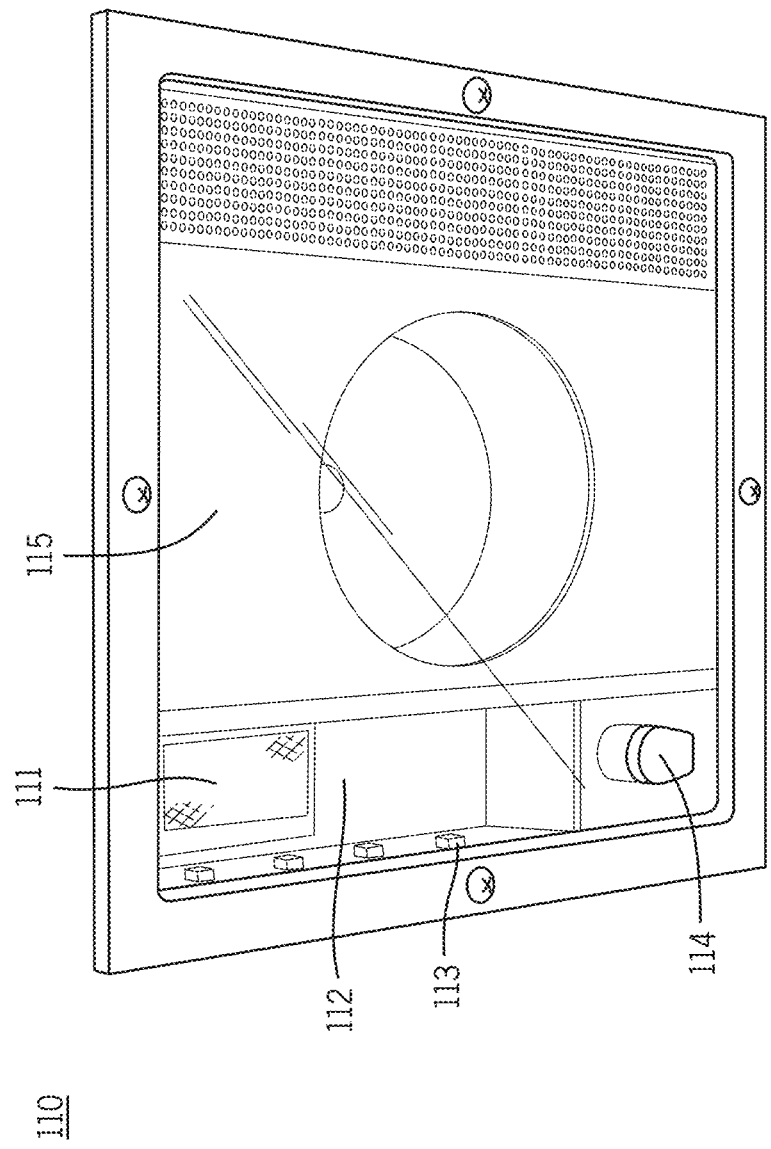
FIG. 4 illustrates an example air purification system for the modular smart bathroom fan.

FIG. 4 depicts an example air purification module 110 associated with the modular smart bathroom fan 100 of FIGS. 1 and 2. The air purification module 110 includes a HEPA filter 111, a PECO filter 112, and a PECO LED 113. The air purification module 110 may include a power supply 114 and a cover 115. The air purification module 110 includes one or more components or modules that may be removed or swapped out as desired by the user. Each of these modules may be plug and play, e.g. configured to be functional as soon as the module is connected to the base station of the modular smart bathroom fan 100.

The HEPA filter 111 and PECO filter 112 may be separate components that may be provided in different modules or in a single module. The modular smart bathroom fan 100 may circulate indoor air through the PECO filter 112, capture particles, eliminates odor, and kills airborne germs/bacteria/viruses. The modular smart bathroom fan 100 may include multiple modes, for example, where under quiet mode the fan motor operates under 80 CFM but ramps up to 150 CFM as user leaves the room till the air quality/humidity is back to an ideal level or preset level. In other words, a controller may receive data indicating the air quality and/or humidity in the ambient environment. The controller compares the data to an air quality threshold and/or a humidity threshold. Based on the comparison, the bathroom fan 100 selects a higher speed fan mode or a lower speed fan mode (e.g., when the data indicates a low air quality and/or a high humidity, the high-speed fan mode and when the data indicates a high air quality and/or low humidity, the low-speed fan mode is selected).

Figure 5:
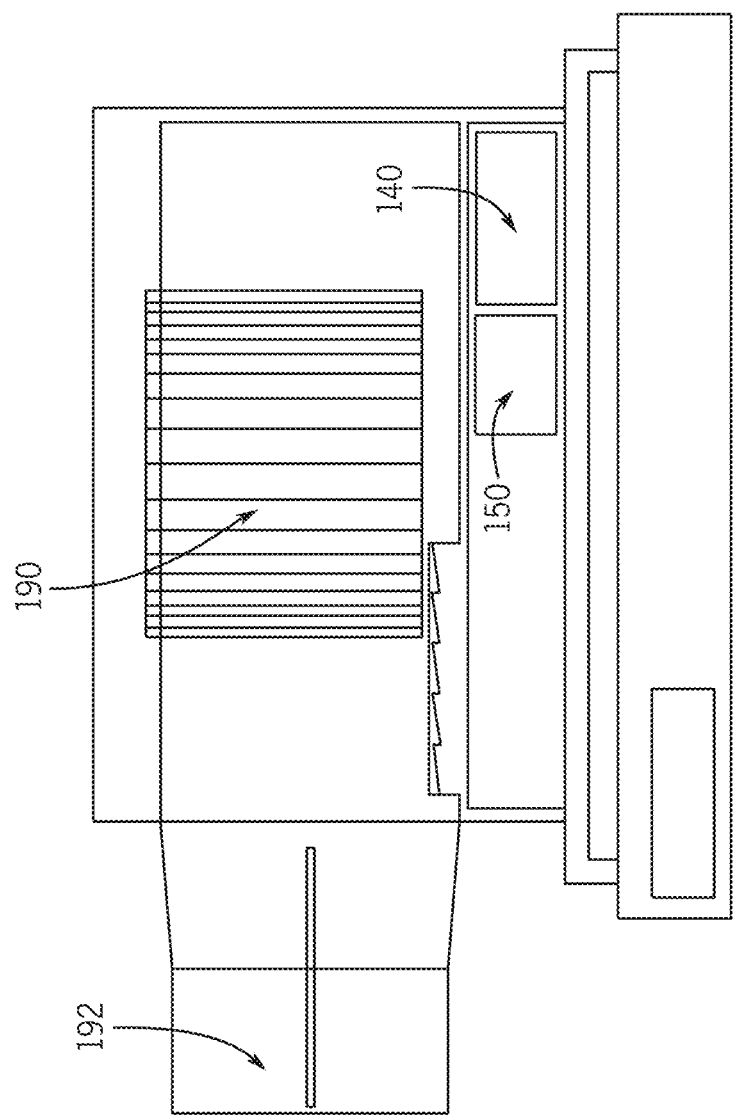
FIG. 5 illustrates an example exhaust fan for the modular smart bathroom fan.

FIG. 5 depicts an example of the exhaust system of the modular smart bathroom fan 100 of FIGS. 1 and 2. FIG. 5 includes a humidity sensor 150, an air quality sensor 140, a blow assembly 190, and an exhaust 192. FIG. 5 illustrates the bathroom fan housing that includes any combination of the components described herein. Additional, different, or fewer components may be included.

Figure 6:
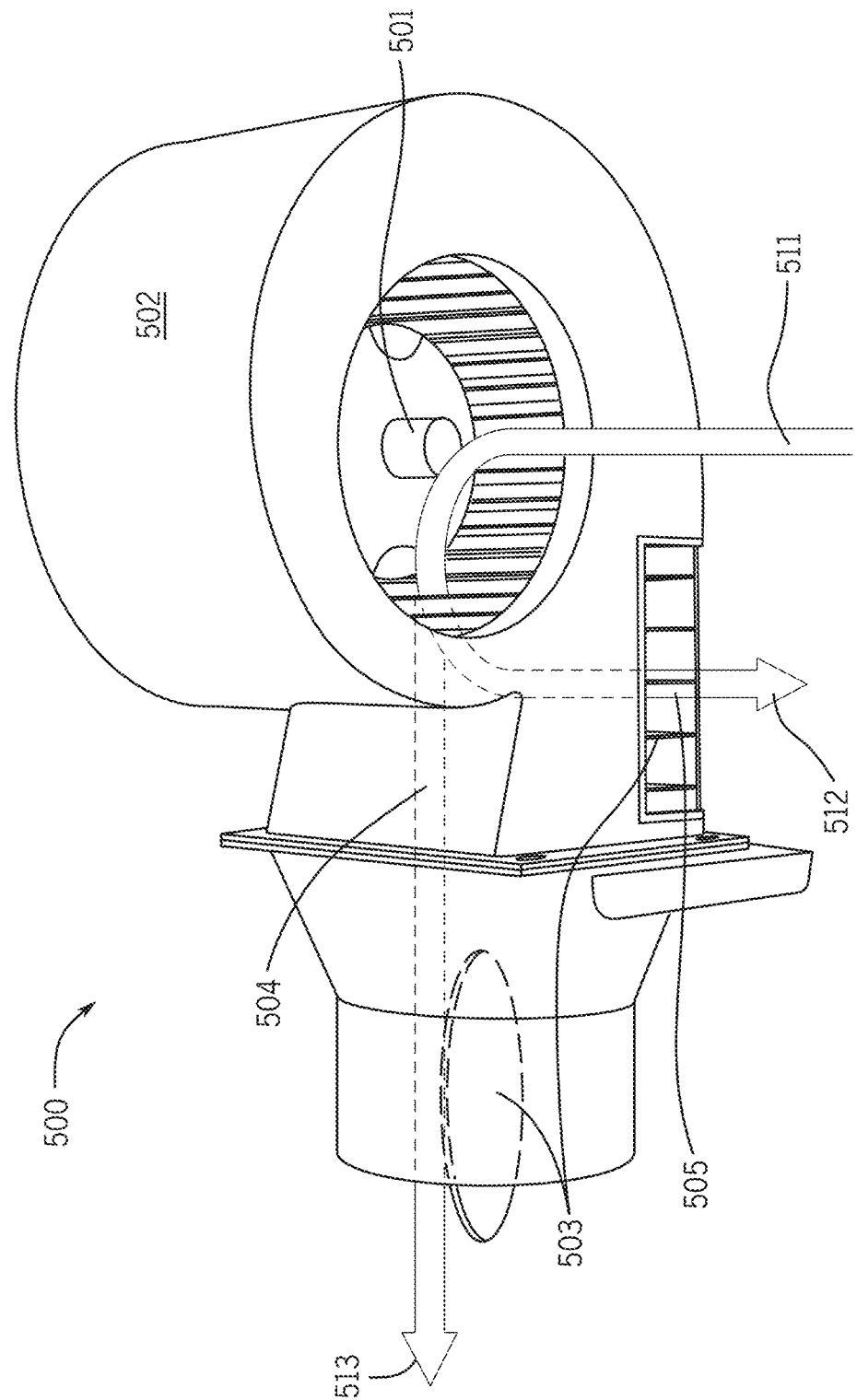
FIG. 6 illustrates an example dual-mode blower assembly for the modular smart bathroom fan.

FIG. 6 depicts an example of a dual-mode blower assembly 500 that is part of the air purification module 110. The dual-mode blower assembly 500 may include a motor 501 within a blower housing 502, one or more louvers 503, a first exhaust output vent 504, and a second exhaust output vent 505. Intake air 511 takes one of two paths, including a filtered air path 512 and a exhaust path 513. Additional, different, or fewer components may be included.

The dual-mode blower assembly 500 includes a humidity control mode that removes humidity from the room by an exhaust vent. The dual-mode blower assembly 500 also includes an air quality control mode that circulates air in the room after filtering the air using the HEPA/PECO filter.

Each of the air quality sensors may be separate modules that may be provided separately and may function independently. For example, the temperature and humidity sensors may be separate modules that plug into different slots in the air quality system or fan base. Alternatively, these modules may be combined into a single module that may be plugged into the system. Each of the sensor modules may communicate with the Wi-Fi connection module 130 or the virtual assistant module 160 in order to provide information that results in one or more actions. For example, the humidity sensor may provide information relating to the humidity of the room. The Wi-Fi connection module 130 may transmit this information to an application which determines that the humidity is too high and thus turns on the exhaust fan. User preferences and settings may be entered by a user to implement these actions. The application or system may also learn user habits in order to preemptively perform one or more actions. For example, after receiving certain information and certain manual actions, the system may perform the manual actions automatically without input from the user. The intelligence can be offered at three levels: at the device level, Edge/Fog nodes, and Cloud computing. At the device level, simple actions and results may be determined. At the edge or cloud, complex interactions may be identified and implemented.

A safety module may be provided that detects whether or not a person is present in the room. The safety module may include one or more sensors that can detect a height, shape, size, or other features of an object within the room where the safety module is located. As an example, the safety module may include a heat sensor that can detect a heat signature of a person that enters the room. The safety module may be configured to recognize or detect a user via recognition of height, size of heat signature, and other non-contact biometrics. The user detection may be used to adjust the bathroom fixtures/experiences to trigger personal presets as the user walks into the bathroom. The safety module may communicate with the other sensors and the Wi-Fi connection module 130 in order to determine if there is an emergency, for example fall detection or if there is something out of the ordinary. As an example, the safety module may be configured to detect if the user has fallen and is immobile on the bathroom floor via, detection of the user, movement (falling motions), heat signature, movement vibrations, etc. The safety module may then generate a notification or alert to a preset user or responsible entity. The safety module may also monitor the presence or non-presence of a user in a bathroom and adjust the setting as such. For example, the safety module may detect that a user has left. The safety module may then adjust the settings of the fan, light, air purification, or other module when nobody is in the room.

The lighting module may be attached to the base of the modular smart bathroom fan 100 to provide multiple types of lighting and to hide or cover up the other modules. For example, a white lighting module may include a 3500K white LED task light with 1000 Lumens that is dimmable and a 0.5 W LED nightlight. A white disinfection light module may include a 405 nm disinfection LED light, a circadian white LED tasklight with 1000 Lumens that is dimmable and a 0.5 W LED nightlight. Other lighting modules that include different lights, for example colored or mood lighting are contemplated. Similar to the other modules, the lighting module may be plug and play and may snap or plug into the base of the modular smart bathroom fan 100 and provide immediate functionality. The lighting module may provide additional functionality when combined with other modules. For example, the lighting module may be remotely controlled using an application if the Wi-Fi connection module 130 is installed. The LED disinfection module may provide additional functionality with the air quality module or other module.

Additional modules or combination may be provided. The modularity of the smart bathroom fan 100 allows for future development into different modules that can be plugged in or added to the system without having to install a new base or replace existing modules. Accordingly, new features may be added piecemeal to the smart bathroom fan platform by a user as new modules become available.

Figure 7:
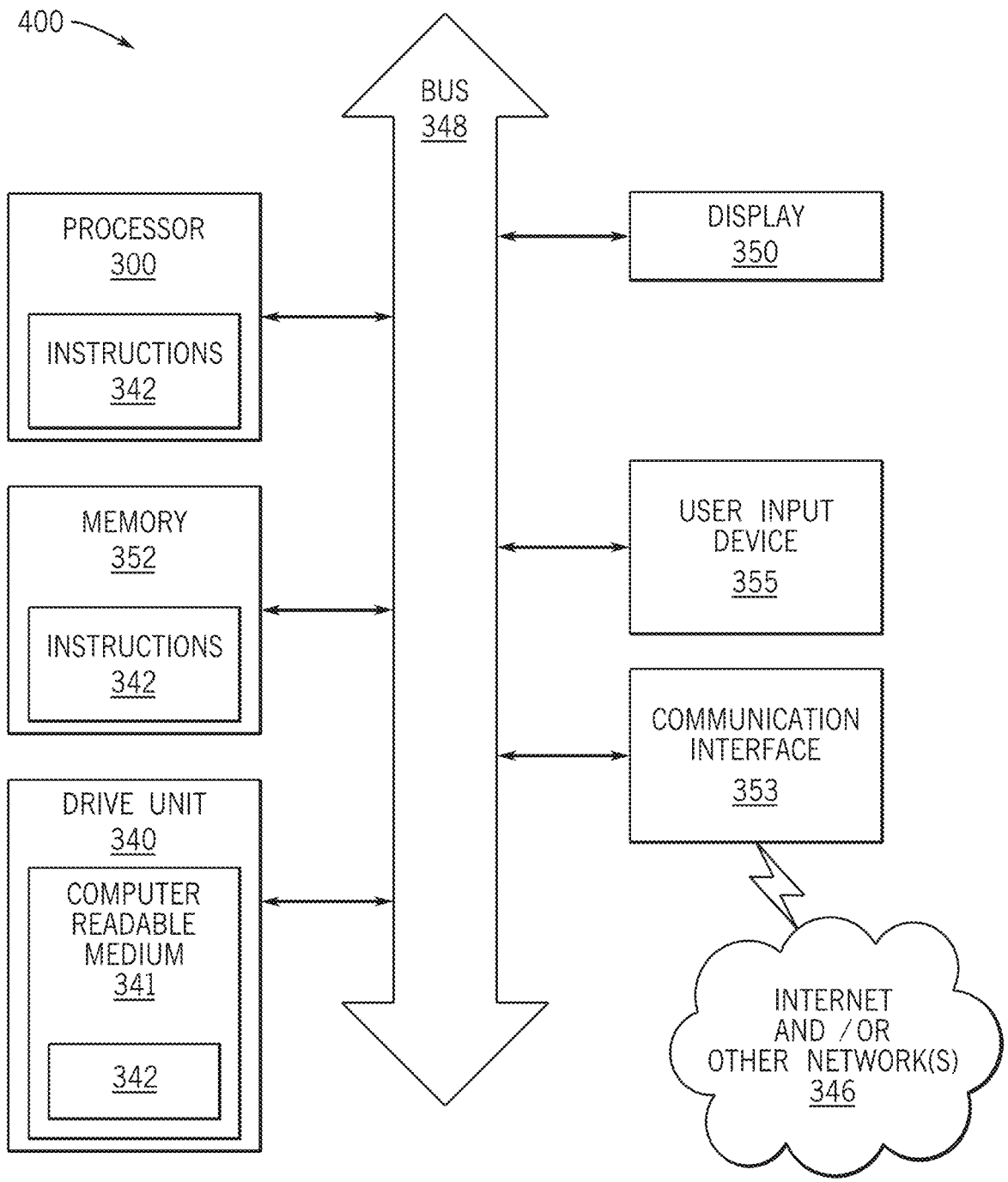
FIG. 7 illustrates a flowchart for operation of the modular smart bathroom fan.

FIG. 7 illustrates an example controller 400 for the operation of the bathroom fan. The controller 400 may include a processor 300, a memory 352, and a communication interface 353 for interfacing with devices or to the internet and/or other networks 346. In addition to the communication interface 353, a sensor interface may be configured to receive data from the sensors described herein or data from any source for analyzing air or other ambient properties or the operation of the appliances described herein. The components of the control system 400 may communicate using bus 348. The control system 400 may be connected to a workstation or another external device (e.g., control panel) and/or a database for receiving user inputs, system characteristics, and any of the values described herein.

The controller 400 may communicate with one or more servers from network 346. The controller 400 may receive commands from other devices through the server. For example, the user may provide commands through a smart phone or a smart watch that are relayed through the server. In addition, specific commands for specific modules may be relayed through the server so that the controller 400 communicates with a server to activate the one or more modules.

The controller 400 may access program code for one or more modules from memory 352 or another server or computer device via network 346. The controller 400 may be a separate device in the bathroom fan 100. The controller 400 may be integrated with the HEPA filter module 110, the PECO LED module 125, the scent module 170, the Wi-Fi connection module 130, the air quality sensor module 135, the humidity sensor module 150, or the virtual assistant module 160. The controller 400 may be distributed as multiple devices across any combination of the modules of the bathroom fan 100. The controller may be a standalone module within the bathroom fan 100.

The controller 400 may access program code for one or more modules in response to installation of another module. For example, the bathroom fan 100 may include a default program code for the virtual assistant module 160, the module HEPA filter module 110 or the PECO LED module 125 that includes a standard operation. However, when the controller 400 determines that the Wi-Fi connection module 130 has been installed, the controller 400 accesses a new program code for the other module such as the virtual assistant module 160, the module HEPA filter module 110 or the PECO LED module 125 are updated to change operation. For example, once wireless connectivity has been established, the virtual assistant module 160 may also be used to access information from the network 346. Similarly, the HEPA filter module 110 or the PECO LED module 125 may also use wireless connectivity for information related to the local atmospheric conditions or user inputs provided by the user on another device.

The controller 400 may change the operation of the exhaust fan as a function of other modules that are connected. For example, when the HEPA filter module 110 or the PECO LED module 125 has been installed, the exhaust fan may be operated on a sequence or duty cycle that includes the fan, the HEPA filter module 110 and/or the PECO LED module 125 in a particular timing. The controller 400 includes a first program code for controlling the base exhaust fan and a second program code for controlling the base exhaust fan and the controller 400 accesses the second program code in response to the communication module being received at the one or more ports.

In another example, the controller 400 may have a default program for a particular module that is changed in response to the installation of another module. For example, the virtual assistant module 160 may be configured to interact only with other modules using the default program. The virtual assistant module 160 may receive user commands (e.g., voice commands) to activate another module for example turn on or change a setting for the HEPA filter module 110, the PECO LED module 125, the scent module 170, the air quality sensor module 135, or the humidity sensor module 150.

However, when the Wi-Fi connection module 130 is installed, the controller 400 may access a second program code for controlling the one or more modules. The controller 400 accesses the second program code in response to the communication module being received at the one or more ports. The second program code may allow the HEPA filter module 110, the PECO LED module 125, the scent module 170, the air quality sensor module 135, or the humidity sensor module 150 to receive data from a server or the internet. In some examples, the user may provide commands from a smart phone or another device connected through network 342 and the Wi-Fi connection module 130.

In another example, the controller 400 may have a default program for particular module that is changed in response to the installation of another module. For example, the air quality sensor module 135 or the humidity sensor module 150 may be configured to collect data from sensors (e.g., air quality sensors or humidity sensors) interact only with other modules. For example, the humidity may be detected by the humidity sensor module 150 to provide the humidity to other modules. The display may include an indicator of local humidity. Alternately, the humidity sensor module 150 may provide the humidity value reads to the HEPA filter module 110 where one or more filter settings are made in response to the humidity values.

However, when the Wi-Fi connection module 130 is installed, the controller 400 may access a second program code for controlling the one or more modules. The controller 400 accesses the second program code in response to the communication module being received at the one or more ports. The second program code may allow the air quality sensor module 135 or the humidity sensor module 150 to communicate with external devices. For example, the humidity sensor values from multiple ceiling fans 100 or other devices may be sent to a server to analyze the humidity of a geographic region. The aggregated humidity may be used for a weather service. The humidity vales may be sent to another appliance such as a humidifier, a dehumidifier, or an air-condition for an operational setting based on the humidity values.

In one embodiment, commands or other data may be received from another device such as a toilet. The second program code may include a command initiated by a flush cycle of a toilet. Information may be collected at a toilet that is useful for starting the operation of the exhaust fan or otherwise controlling the exhaust fan. The second program code includes access to sensor data from an external device.

For example, the toilet may include a flush cycle. First, after the flush cycle is triggered by a user input or automatically, the supply of water may be supplied by the flush cycle of the toilet. For example, water may be provided through rim jets of the toilet (e.g., from a tank or direct supply). The water washes the tank and falls to the sump into the trapway in order to break the siphon and cause the water in the toilet bowl to drain.

The user input for the toilet may also trigger a command, communicated wirelessly, for the bathroom fan 100 to operate. That is, when the toilet is flushed, the exhaust fan is automatically turned on. In another example, the toilet may count a number of flushes and trigger the fan after a predetermined number of flushes have been detected. Other sensors on the toilet may trigger the bathroom fan 100 to operate. Such sensors on the toilet may include ozone sensors to determine when there may be ozone in the environment of the toilet that should be vented away from the room. The sensors may include volatile compound sensors to determine usage on the toilet that could benefit from venting. The sensors may include presence sensors that determine when a user is standing near or sitting on the toilet. Other modules may be triggered by commands originating with the sensors of the toilet. For example, the HEPA filter module 110, the PECO LED module 125, the scent module 170 may be turned on configured based on the sensor data from the toilet.

In another example, the bathroom fan 100 may receive command from a remote control (e.g., infrared, Wi-Fi, Bluetooth) to provide commands for any of the modules of the bathroom fan 100. Alternatively, the bathroom fan 100 may receive commands from the remote control of another device such as a toilet. The program code or the hardware of the controller 400 includes an interface for interaction with either of these types of remote controls.

Optionally, the control system 400 may include an input device 355 and/or a sensing circuit in communication with any of the sensors. The sensing circuit receives sensor measurements from as described above. The input device 355 may include a switch (e.g., actuator), a touchscreen coupled to or integrated with, a keyboard, a remote, a microphone for voice inputs, a camera for gesture inputs, and/or another mechanism.

Optionally, the control system 400 may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be supported by any of the components described herein. The display 350 may be combined with the user input device 355.

Figure 8:
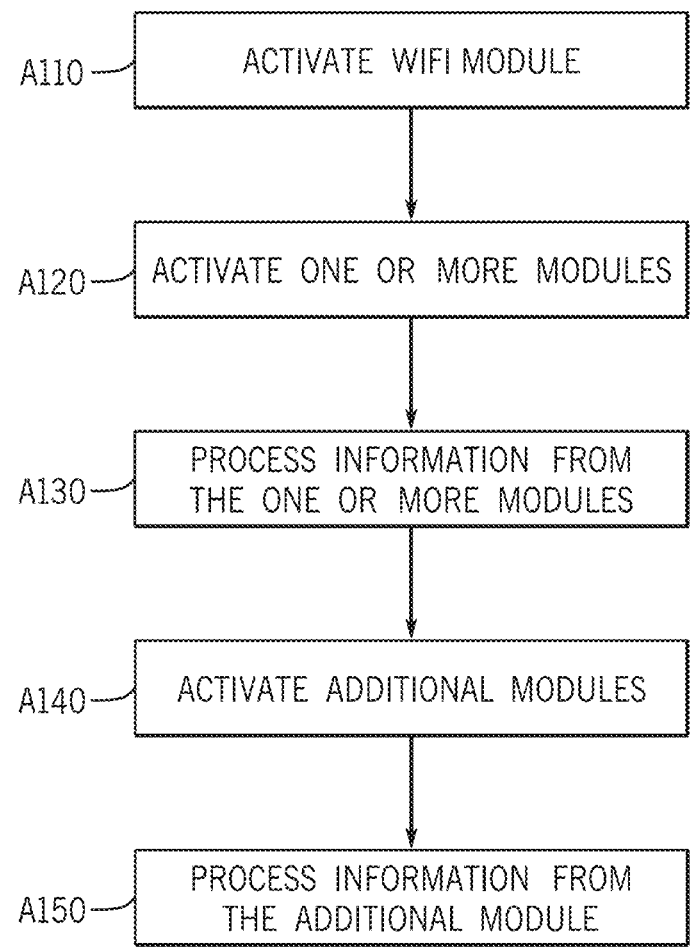
FIG. 8 illustrates an example smart mirror.

FIG. 8 depicts a workflow for operation of the modular smart bathroom fan 100. In operation, the base of the modular smart bathroom fan 100 is first installed into a location by a user. The base including the base fan is configured to operate as a typical exhaust fan. A switch may be used to operate (turn on off or other features) the exhaust fan.

At act A110, the Wi-Fi connection module 130/communications module is activated in the base. The installation of the communication module 130 may trigger a variety of operations. The controller 400 may connect to a server. The controller 400 may check for updates (e.g., firmware, software, or functionality updates for each of the modules) and download the updates accordingly. The controller 400 may check for user configuration settings (e.g., user settings or preferences made on a computer, phone, or tablet) and download the user configuration settings accordingly. In response to the updates or the user configuration settings, the controller 400 may provide instructions or commands to one or more of the other modules.

At act A120, one or more of the modules are activated in the base. The controller 400 may activate the modules in response to the presence of the module (i.e., that the module has been installed in the smart fan 100). The controller 400 may access a program code from one or more installed modules. The controller 400 may unlock a program code already stored in the memory of the controller 400 in response to the presence of the module.

At act A130, information from the one or more installed modules is processed by the Wi-Fi connection module 130 and used to automatically generate a first action that directs the exhaust fan, lighting, or other installed module to turn on, turn off, adjust power, etc.

At act A140, one or more additional modules are activated in the base. The activation of an additional module may enable functions of an already installed module. The controller 400 may access a program code from an existing module (first module) in response to the installation or activation of an additional module (second module). The controller 400 may unlock a program code already stored in the memory of the controller 400 for the existing module (first module) in response to the presence of the additional module (second module).

At act A150, information from the one or more additional installed modules is processed and used to generate a second action that directs the exhaust fan, lighting, or other installed module to turn on, turn off, adjust power, etc. As an example, the Wi-Fi connection module 130 is installed. The scent module 170 is activated. The Wi-Fi connection module 130 can now direct the scent module 170 to output scents. The virtual assistant module 160 is then activated. A user may now speak to the speaker in the virtual assistant which passes information to the Wi-Fi connection module 130 which can control the other modules. In this way, the smart modular bathroom fan may operate as a simple exhaust fan, a Wi-Fi enabled exhaust fan, a Wi-Fi enabled scent dispersing exhaust fan, or a voice activated Wi-Fi enabled scent dispersing exhaust fan without having to reinstall or adjust the base exhaust fan. Additional combinations are possible depending on the modules installed.

In an embodiment, the one or more additional modules may not function until the Wi-Fi connection module 130/communications module is installed. For example, while the scent module 170 may be plugged in at any time, it may not provide any functionality until the Wi-Fi connection module 130/communications module is installed and configured. Alternatively, each module may have some inane functionality even without the Wi-Fi connection module 130/communications module installed. For example, the scent module 170 may be configured to dispense a scent at regular intervals or at the press of a button even though the Wi-Fi connection module 130/communications module is not installed.

In an embodiment, the modular smart bathroom fan 100 may be in communication with one or more other smart devices in the bathroom and may use information or data from the one or more other smart devices to generate an action. For example, a smart mirror 200 may be included in a smart bathroom system.

Figure 9:
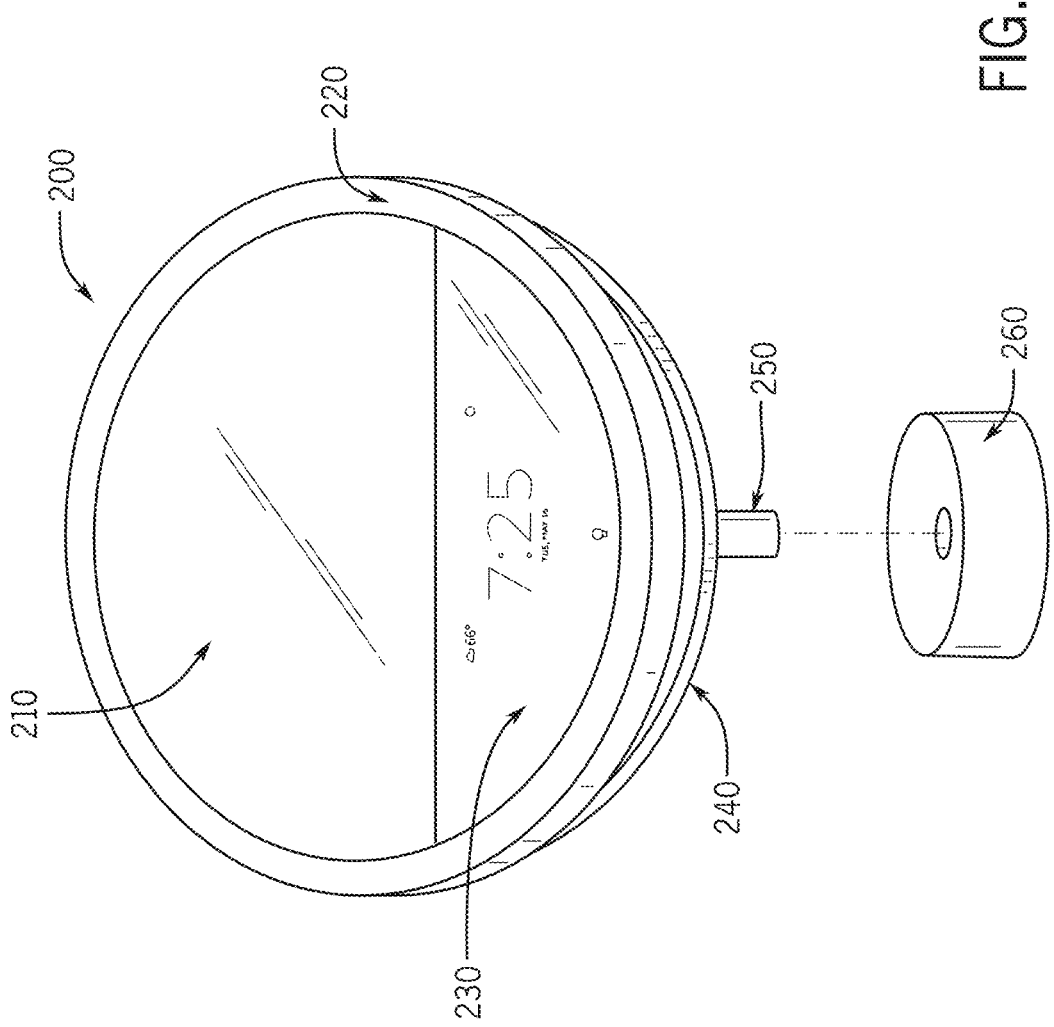
FIG. 9 illustrates the interior of an example smart mirror.

FIG. 9 depicts a multifunction smart mirror 200 that changes its functionality based on which accessory the multifunction smart mirror 200 is coupled with. The multifunctional smart mirror 200 includes a structural rim 220, a display 230, a hinge arm 240, and a docking mechanism 250. The docking mechanism 250 may be configured to mate with stand 260.

Figure 10:
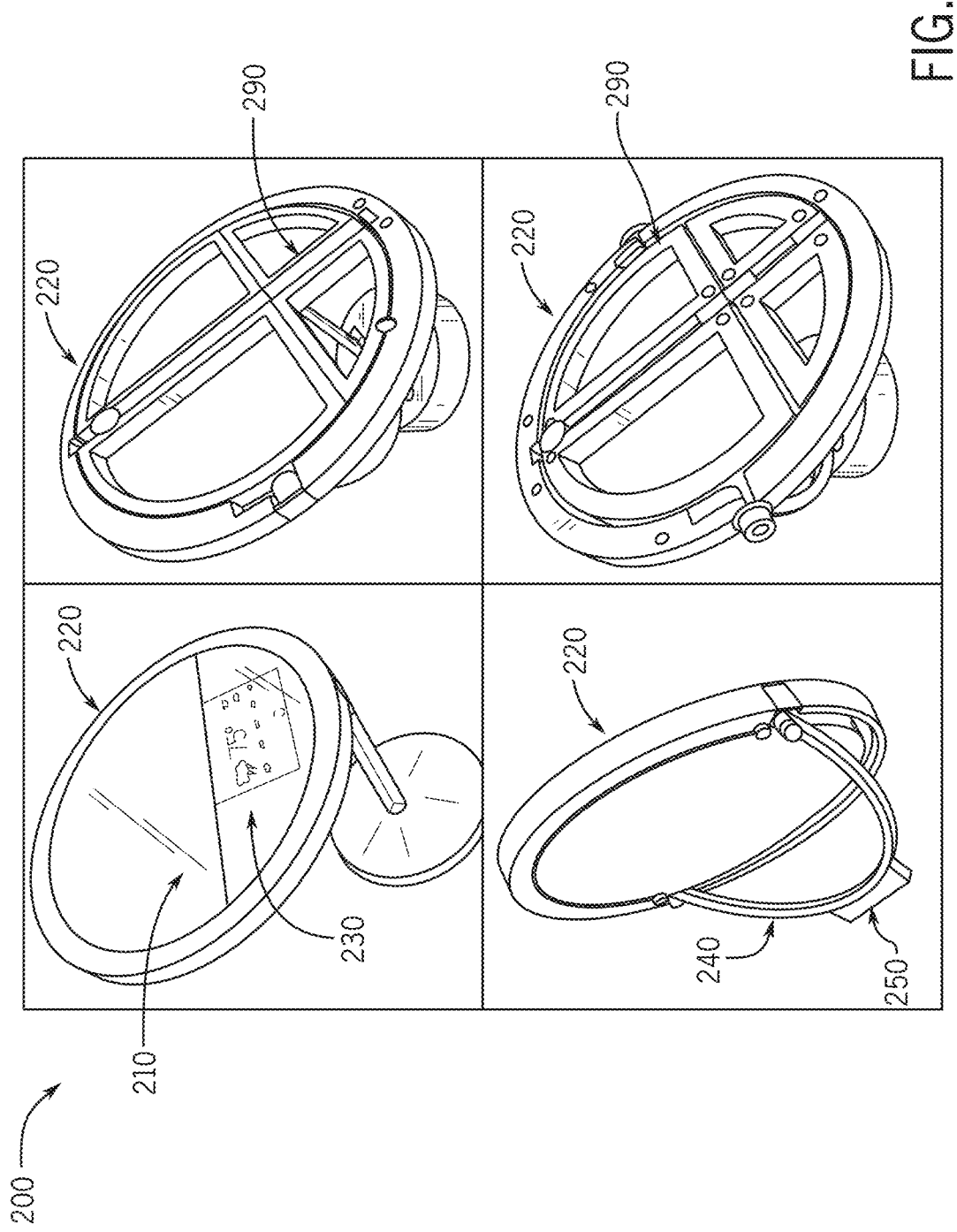
FIG. 10 illustrates the example smart mirror and one or more docking accessories for the smart mirror.

FIG. 10 depicts a mirrored surface 210 that may be reversible. The multifunction smart mirror 200 includes a structural rim 220, a display 230, a hinge arm 240, and a docking mechanism 250. The docking mechanism 250 may be configured to mate with stand 290. Additional, different, or fewer components may be included.

The smart mirror 200 is configured to be used in both wet and dry locations and may be waterproof or water resistant. The smart mirror 200 may include a reversible mirror that two different levels of magnification, for example 1× and 5×. The smart mirror 200 may include light brightness options and light color options.

The smart mirror 200 may be circular or oval shaped by a structural rim 220 with the mirrored surface 210 and the display 230 enclosed. The smart mirror 200 includes an arm or hinge 240 for support and communication with one or more accessories. The hinge/horse-shoe shaped arm 240 is configured to rotate around the smart mirror 200 and provide both support and communications through the adaptable port/docking mechanism 250 located in the hinge support. Using the hinge support, the smart mirror 200 may be adjustable to any degree of tilt and may be configured to stand on its own works as a stand when friction is applied. The hinge support 240 is configured to fit within the structural rim 220 so that the smart mirror 200 is easily portable.

The smart mirror 200 may include a processor and memory that are configured to store and execute instructions or applications stored therein. The processor may be one or more general processors, digital signal processors, application specific integrated circuits, field programmable gate arrays, servers, networks, digital circuits, analog circuits, combinations thereof, or other now known or later developed devices for analyzing and processing data. The memory may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like.

The processor is configured to receive instructions from an input device such as a touchscreen, keypad, microphone, or transceiver. The processor is configured to execute the instructions and provide output on an output device such as a screen, display, speaker, etc. The processor may be configured to change settings such as lighting etc. on the smart mirror 200.

The smart mirror 200 includes a display/screen 230 that provides information to the user and may be interacted with to request information or change the view. The display 230 is a monitor, LCD, or other now known or later developed devise for outputting visual information. The display 230 receives images, graphics, text, quantities, or other information from the processor, memory, or for example, a virtual assistant.

The smart mirror 200 includes a battery that is configured to power the processor, memory, display 230, and/or lighting system. The battery may be charge using the charging dock or by other mechanisms such as wireless charging or by plugging in the smart mirror 200 to a power source.

The smart mirror 200 may include a virtual assistant. The virtual assistant may record voice commands using a microphone and send the voice commands to a cloud system through a network connection. The cloud system may collect information in response to the voice commands and reply to the virtual assistant with the information. The smart mirror 200 may include an LCD screen 230, touchscreen 230, or display 230 where information may be provided to a user. Different applications or widgets may be provided that gather and display information. For example, a weather application may display current weather information. A news application may display current headlines. A scheduling application may display a user's schedule for the future. The smart mirror 200 may provide lighting controls, for example, to turn on or off the light, adjust the brightness, tone, or provide preset lighting settings. The virtual assistant may be used to control other connected applications, for example the modular smart bathroom fan 100 described above, a smart toilet, a smart shower, etc. In an embodiment, the virtual assistant is not included in the smart mirror 200, but rather is included in a docking accessory as described below.

The smart mirror 200 includes a docking mechanism 250/adaptable port on the hinge/arm. The docking mechanism 250 may be used for communication or power transmission between the smart mirror 200 and one or more docking accessories.

The smart mirror 200 includes multiple docking accessories. For example, a weighted non-charging desk dock, a charging dock, a speaker dock, a shower wall mount dock with storage shelf, and an articulated wall mount arm. The smart mirror 200 is configured so that it may connect to each of these accessories and perform different functions as a result of which accessory it is connected to using the docking mechanism. In this way, the smart mirror 200 is multifunctional and easily configurable depending on the desires or preferences of the user.

Figure 11:
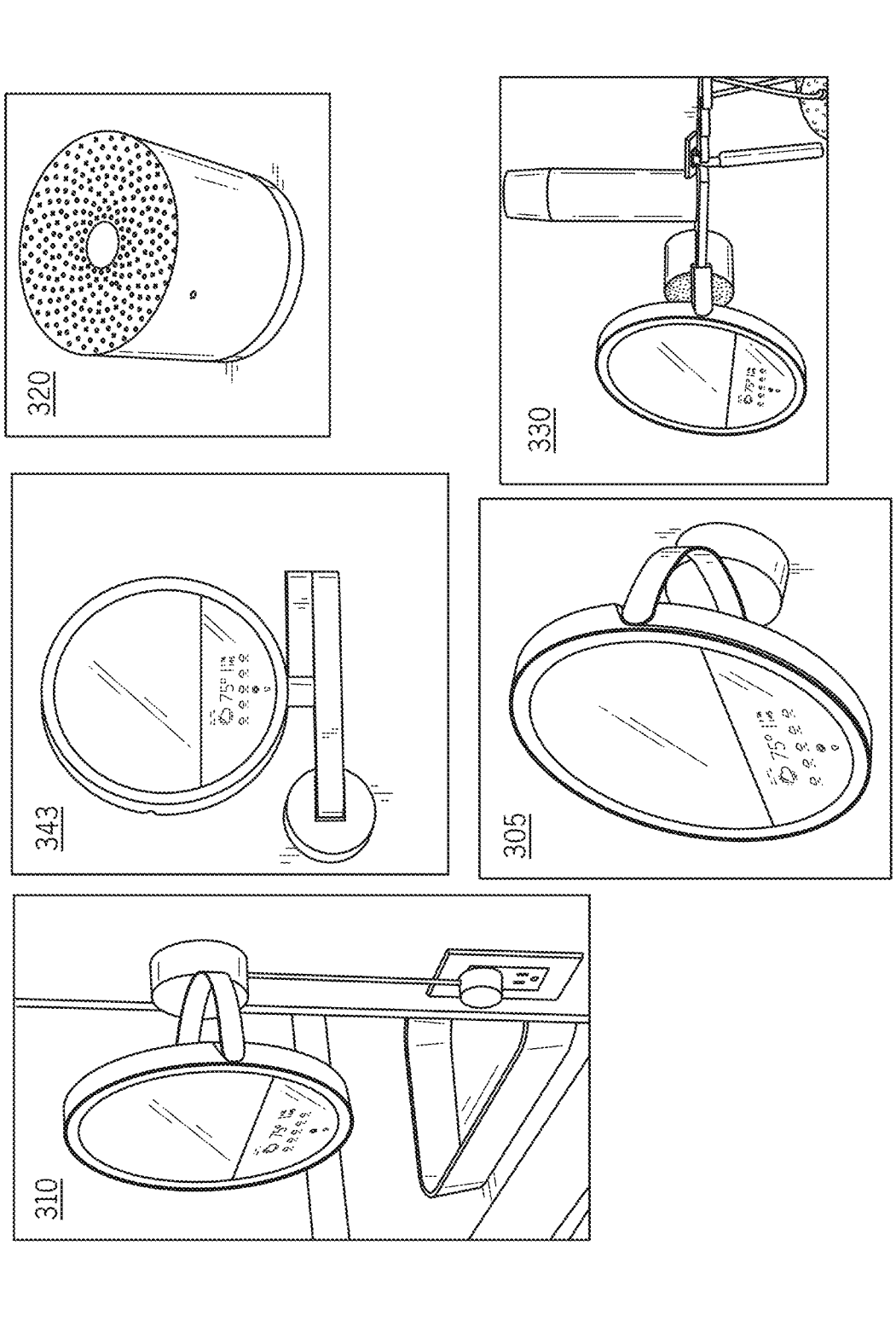
FIG. 11 illustrates docking accessories for the smart mirror.

FIG. 11 depicts examples of the smart mirror 200 of FIGS. 9 and 10 docked with the docking accessories, for example, the standard dock 305, the charging dock 310, the speaker dock 320, the shower wall mount dock with storage shelf 330, and the articulated wall mount arm dock 343.

In a standard dock 305, the smart mirror 200 may offer no additional functionality. The smart mirror 200, using the standard dock 305, may be, for example, placed on the counter, nightstand, etc. or mounted on the wall. The weighted non-charging desk dock may be shaped like a cylinder and may provide a weighted or anchored dock for the smart mirror 200. In operation, the docking mechanism fits inside a hole or dock in the weighted non-charging desk dock which anchors the smart mirror 200. The dock may include one or more fasteners to hold the smart mirror 200 in place such as a clip or may use friction to prevent the smart mirror 200 from being withdrawn. The dock may also be magnetic and use magnetic force to hold the docking mechanism and smart mirror 200 in place.

The charging dock 310 may be shaped similar to the weighting non-charging desk dock, for example shaped like a cylinder. The charging dock 310 provides power to the smart mirror 200 or a battery stored therein. The charging dock 310 is further configured with a connection to a power source for example an outlet. The connection may be a cable, a wireless connection, or other known connection. The charging dock 310 may include a battery that is charged and thus may charge or power the smart mirror 200 even while not connected to the power source.

In an embodiment, the smart mirror 200 does not include a display or smart assistant but rather may exist as a basic lighted mirror. A virtual assistant or smart assistant may be provided when the smart mirror 200 is placed into the speaker dock 320. The speaker dock 320 may be similarly shaped as the standard dock 305 or the charging dock 310. The speaker dock 320 includes premium speakers. The speaker dock 320 may add both a smart/virtual assistant and charging to a basic lighted mirror. The speaker dock 320 may include support for a virtual assistant. The virtual assistant may record voice commands using a microphone.

The shower wall mount dock 330 with storage shelf is configured to be used in a shower or bathroom. The shower wall mount dock 330 includes an articulated wall mount arm is configured to provide multiple different positions for holding the smart mirror 200. The articulated wall mount includes multiple hinges that allows the smart mirror 200 to be rotated in multiple directions.

The smart mirror 200 may also include a dock or attachment that provides a smart sensor or camera. The smart sensor or camera may be used to sense a user's biometrics and display/provide information related to the user's biometrics or health status. In an embodiment, the smart sensor or camera provides the extraction of a large set of vital signs and mental stress measurements based on the analysis of a video or image. The analysis may use Photoplethysmography (PPG) to detect blood volume changes in a microvascular bed of tissue at the skin surface, for example through the use of a PPG finger sensor. The analysis may detect or calculate Heart Rate, Oxygen Saturation (SpO2) and Respiration Rate. Heart Rate Variability (HRV) may also be calculated based on Heart Rate data and may serve as the data upon which Mental Stress measurements are provided.

Figure 12:
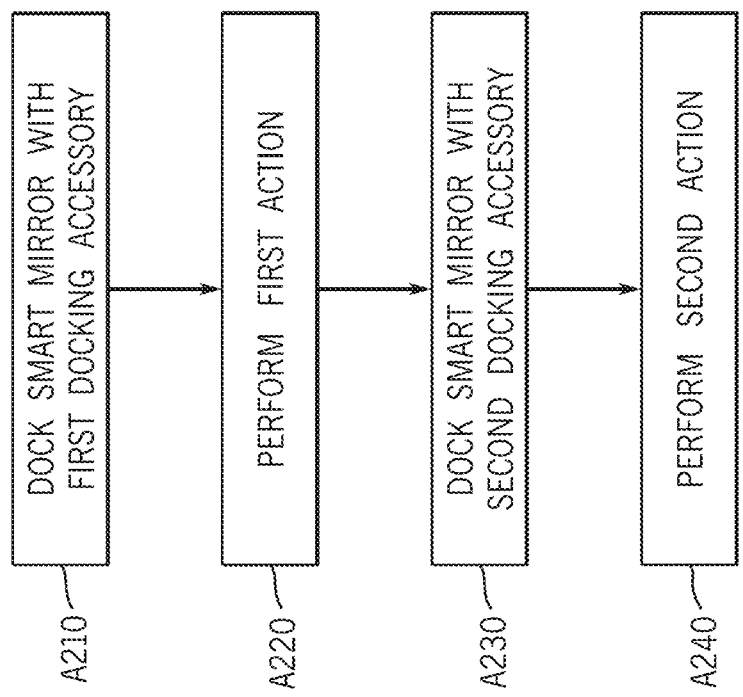
FIG. 12 illustrates a flowchart for operation of the modular smart mirror.

FIG. 12 depicts a flowchart of the operation of the smart mirror 200. At A210, the smart mirror 200 is docked with a first docking accessory. At A220, the smart mirror 200 performs a first action that is related to the first docking accessory. The first action may include the display of information, for example, access from an external device. The information may include weather, email, calendar, or other information. The first action may include a basic mirror function such as a back light. The first action may include charging the mirror and associated electronics.

At A230, the smart mirror 200 is docked with a second docking accessory. At A240, the smart mirror 200 performs a second action that is related to the second docking accessory. The second action may include the collection of data (e.g., sensor data) regarding the user. The sensor data may include temperature, viral load, antibody tests, oxygen level, blood test, or other biometric medical data. The sensor may include a camera and the sensor data may include any vital signs or mental stress tests based on the analysis including photoplethysmography (PPG) to detect blood volume changes in a microvascular bed of tissue at the skin surface, heart rate, oxygen saturation (SpO2), respiration rate, or heart rate variability (HRV).

The second action may be any function of a smart assistant and receive commands from the user. In an embodiment, a user keeps the smart mirror 200 in a first location (e.g., in a charging dock). The user then moves the smart mirror 200 into the shower and places the smart mirror in the shower docking station. The user then places the smart mirror 200 in the smart dock which allows the smart mirror to detect the health state of the user while the user performs one or more grooming actions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A modular smart bathroom fan comprising:
   one or more modules for operations of the smart bathroom fan;
   a base exhaust fan comprising one or more ports that are configured to receive the one or more modules;
   the one or more modules comprising a communications module that is configured to communicate with the base exhaust fan and other modules of the one or more modules, receive information from an application or the one or more modules and generate an action to be performed by the base exhaust fan and other modules of the one or more modules; and
   a controller configured to activate the one or more modules in response to the one or more modules being received at the one or more ports, wherein the controller includes a first program code for controlling the base exhaust fan and a second program code for controlling the base exhaust fan, wherein the controller receives the second program code in response to the one or more modules being connected at the one or more ports.

2. The modular smart bathroom fan of claim 1, wherein the one or more ports include a mechanical dock configured to secure the one or more modules to the base exhaust fan.

3. The modular smart bathroom fan of claim 1, wherein the one or more ports include an electronic dock configured to provide communications between the one or more modules and the base exhaust fan.

4. The modular smart bathroom fan of claim 1, wherein the controller accesses the second program code in response to the communication module being received at the one or more ports.

5. The modular smart bathroom fan of claim 4, wherein the second program code includes an interface for a remote control.

6. The modular smart bathroom fan of claim 1, wherein the controller includes a first program code for controlling the base exhaust fan and a second program code for controlling the base exhaust fan, wherein the controller accesses the second program code in response to the one or more modules being received at the one or more ports.

7. The modular smart bathroom fan of claim 1, wherein the controller includes a first program code for controlling one or more modules and a second program code for controlling the one or more modules, wherein the controller accesses the second program code in response to the communication module being received at the one or more ports.

8. The modular smart bathroom fan of claim 7, wherein the second program code includes access to sensor data from an external device.

9. The modular smart bathroom fan of claim 7, wherein the second program code includes a command initiated by a flush cycle of a toilet.

10. The modular smart bathroom fan of claim 1, wherein the one or more modules further comprise at least one of: a virtual assistant module, a scent module, a humidity module, an air quality module, or an air purification module.

11. The modular smart bathroom fan of claim 10, wherein installation of the communication module enables reporting of data from the virtual assistant module, the scent module, the humidity module, the air quality module, or the air purification module to a server.

12. A modular smart bathroom fan comprising:
one or more modules for operations of the smart bathroom fan;
a base exhaust fan comprising one or more ports that are configured to receive the one or more modules;
the one or more modules comprising a communications module that is configured to communicate with the base exhaust fan and other modules of the one or more modules, receive information from an application or the one or more modules and generate an action to be performed by the base exhaust fan and other modules of the one or more modules; and
a controller configured to activate the one or more modules in response to the one or more modules being received at the one or more ports, wherein the communications module includes the controller, and the controller communicates with a server to activate the one or more modules.

13. The modular smart bathroom fan of claim 12, wherein the one or more modules further comprise at least one of: a virtual assistant module, a scent module, a humidity module, an air quality module, or an air purification module.

14. The modular smart bathroom fan of claim 13, wherein installation of the communication module enables reporting of data from the virtual assistant module, the scent module, the humidity module, the air quality module, or the air purification module to a server.

15. A modular smart bathroom fan comprising:
one or more modules for operations of the smart bathroom fan;
a base exhaust fan comprising one or more ports that are configured to receive the one or more modules;
the one or more modules comprising a communications module that is configured to communicate with the base exhaust fan and other modules of the one or more modules, receive information from an application or the one or more modules and generate an action to be performed by the base exhaust fan and other modules of the one or more modules; and
a controller configured to receive program code over a network for the one or more modules in response to the one or more modules being installed in the base exhaust fan.

16. The modular smart bathroom fan of claim 15, wherein the controller receives a user input to activate the one or more modules.

17. The modular smart bathroom fan of claim 15, wherein the controller activates a first module of the one or more modules in response to installation of a second module of the one or more modules.

18. The modular smart bathroom fan of claim 15, wherein the controller is configured to unlock program code in response to the one or more modules being installed in the base exhaust fan.

* * * * *